United States Patent
Fernandez-Galindo et al.

(10) Patent No.: US 11,858,363 B2
(45) Date of Patent: Jan. 2, 2024

(54) BUSBAR ASSEMBLY FOR AN ELECTRIFIED VEHICLE AND METHOD OF FORMING THE SAME

(71) Applicant: FORD GLOBAL TECHNOLOGIES, LLC, Dearborn, MI (US)

(72) Inventors: Francisco Fernandez-Galindo, Canton, MI (US); Daniel Paul Roberts, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 93 days.

(21) Appl. No.: 17/509,148

(22) Filed: Oct. 25, 2021

(65) Prior Publication Data
US 2022/0045405 A1 Feb. 10, 2022

Related U.S. Application Data

(62) Division of application No. 15/461,104, filed on Mar. 16, 2017, now Pat. No. 11,189,887.

(51) Int. Cl.
| | |
|---|---|
| *H01M 50/296* | (2021.01) |
| *H01M 50/507* | (2021.01) |
| *H01R 43/16* | (2006.01) |
| *B60L 50/64* | (2019.01) |
| *H01M 50/209* | (2021.01) |

(Continued)

(52) U.S. Cl.
CPC ........... *B60L 50/64* (2019.02); *H01M 50/209* (2021.01); *H01M 50/249* (2021.01); *H01M 50/296* (2021.01); *H01M 50/507* (2021.01); *H01M 50/522* (2021.01); *H01R 43/16* (2013.01); *H01M 2220/20* (2013.01)

(58) Field of Classification Search
CPC ............................. H01M 50/507; H01R 43/16
See application file for complete search history.

(56) References Cited

U.S. PATENT DOCUMENTS

| | | | |
|---|---|---|---|
| 5,915,998 A * | 6/1999 | Stidham | H01R 13/5213 439/798 |
| 7,611,798 B2 | 11/2009 | Yoon et al. | |

(Continued)

FOREIGN PATENT DOCUMENTS

| | | |
|---|---|---|
| CN | 1551384 A | 12/2004 |
| CN | 102082516 A | 6/2011 |

(Continued)

OTHER PUBLICATIONS

Chinese Official Action dated May 24, 2022 for CN Application No. 2018102005084.

(Continued)

*Primary Examiner* — Jonathan G Jelsma
(74) *Attorney, Agent, or Firm* — David B. Kelley; Carlson, Gaskey & Olds, P.C.

(57) ABSTRACT

A battery assembly according to a non-limiting aspect of the present disclosure includes, among other things, an array of battery cells, with each cell including a terminal, and a busbar assembly having a first busbar component and a second busbar component. Further, each of the terminals are electrically coupled to both the first busbar component and the second busbar component. A method of forming a busbar assembly is also disclosed.

5 Claims, 6 Drawing Sheets

(51) Int. Cl.
*H01M 50/249* (2021.01)
*H01M 50/522* (2021.01)

(56) References Cited

U.S. PATENT DOCUMENTS

| | | | |
|---|---|---|---|
| 2005/0031946 A1 | 2/2005 | Kruger et al. | |
| 2012/0115014 A1 | 5/2012 | Park et al. | |
| 2014/0370339 A1 | 12/2014 | Kim et al. | |
| 2015/0072208 A1 | 3/2015 | Balk et al. | |
| 2016/0013600 A1* | 1/2016 | Salas Zamarripa | B21D 35/003 |
| | | | 439/110 |
| 2016/0308187 A1 | 10/2016 | Subramanian et al. | |
| 2017/0179459 A1* | 6/2017 | Sato | H01M 50/528 |

FOREIGN PATENT DOCUMENTS

| | | |
|---|---|---|
| CN | 102308433 B | 4/2014 |
| CN | 104813416 A | 7/2015 |
| CN | 105591048 A | 5/2016 |
| DE | 102015203966 A1 | 9/2015 |
| DE | 102015010989 A1 | 3/2016 |
| DE | 112014006025 T5 | 10/2016 |
| JP | 2011076936 A | 4/2011 |
| JP | 2011249243 A | 12/2011 |
| WO | 2016077266 A1 | 5/2016 |

OTHER PUBLICATIONS

Chinese Official Action dated Nov. 17, 2021 for CN Application No. 2018102005084.

\* cited by examiner

BUSBAR ASSEMBLY FOR AN ELECTRIFIED VEHICLE AND METHOD OF FORMING THE SAME

RELATED APPLICATIONS

This application is a divisional of prior U.S. application Ser. No. 15/461,104, filed Mar. 16, 2017, the entirety of which is herein incorporated by reference.

BACKGROUND

This disclosure relates to a busbar assembly for an electrified vehicle, and also relates to a method of forming the busbar assembly.

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on an internal combustion engine to propel the vehicle.

Electrified vehicles include one or more high voltage battery assemblies, each of which includes a number of battery cells. The various cells are connected by a plurality of busbars. Specifically, the busbars are used to carry current from the terminals of one cell to another. Typically, a one-piece busbar is used to connect the terminals of a plurality of cells.

SUMMARY

A battery assembly according to a non-limiting aspect of the present disclosure includes, among other things, an array of battery cells, with each cell including a terminal, and a busbar assembly having a first busbar component and a second busbar component. Further, each of the terminals are electrically coupled to both the first busbar component and the second busbar component.

In a further non-limiting embodiment of the foregoing battery assembly, each terminal is electrically coupled to a tab, and each tab is connected to both the first busbar component and the second busbar component.

In a further non-limiting embodiment of any of the foregoing battery assemblies, each of the first busbar component and the second busbar component includes a carrier and a plurality of feeders projecting from the carrier.

In a further non-limiting embodiment of any of the foregoing battery assemblies, each feeder of the first busbar component is connected to a corresponding feeder of the second busbar component by a respective one of the tabs.

In a further non-limiting embodiment of any of the foregoing battery assemblies, the tabs are welded to the feeders of the first busbar component and the second busbar component.

In a further non-limiting embodiment of any of the foregoing battery assemblies, the feeders of the first busbar component are spaced-apart from the feeders of the second busbar component.

In a further non-limiting embodiment of any of the foregoing battery assemblies, the carriers of the first and second busbar components are parallel to one another.

In a further non-limiting embodiment of any of the foregoing battery assemblies, the feeders of the first and second busbar components project substantially perpendicular from a respective carrier.

In a further non-limiting embodiment of any of the foregoing battery assemblies, the feeders of the first and second busbar components are substantially aligned with one another relative to a length of the battery assembly.

In a further non-limiting embodiment of any of the foregoing battery assemblies, each of the tabs project outwardly from a side of the array of battery cells.

In a further non-limiting embodiment of any of the foregoing battery assemblies, each of the tabs are moveable between a straight position and a folded position, and each tab connects the first busbar component to the second busbar component when in the folded position.

In a further non-limiting embodiment of any of the foregoing battery assemblies, the tabs project through windows between adjacent feeders when in the straight position.

In a further non-limiting embodiment of any of the foregoing battery assemblies, the busbar assembly includes an electrical input and an electrical output, one of the electrical input and electrical output being on the first busbar component and the other of the electrical input and electrical output being on the second busbar component.

In a further non-limiting embodiment of any of the foregoing battery assemblies, the assembly further comprises a frame configured to hold the first busbar component and the second busbar component relative to the battery array, the frame having a base and cantilevered arms projecting from the base.

A method of making a busbar assembly according to a non-limiting aspect of the present disclosure includes, among other things, forming a first busbar component and a second busbar component from a blank of material.

In a further non-limiting embodiment of the foregoing method, the first busbar component and the second busbar component are formed using a single cutting process.

In a further non-limiting embodiment of any of the foregoing methods, the forming step includes cutting the blank of material beginning at a first perimeter edge of the blank and ending at a second perimeter edge of the blank opposite the first perimeter edge.

In a further non-limiting embodiment of any of the foregoing methods, the forming step includes cutting a serpentine pattern in the blank between the first perimeter edge and the second perimeter edge.

In a further non-limiting embodiment of any of the foregoing methods, the serpentine pattern includes a plurality of perpendicular turns.

In a further non-limiting embodiment of any of the foregoing methods, the first busbar component is substantially the same size and shape as the second busbar component.

DETAILED DESCRIPTION

This disclosure relates to a busbar assembly for an electrified vehicle, and also relates to a method of forming the busbar assembly. In this disclosure, the busbar assembly has a first busbar component and a second busbar component. When the busbar assembly is used in a battery assembly, the terminals of a plurality of battery cells are electrically coupled to both the first busbar component and the second busbar component. Among other benefits, the disclosed busbar assembly is formed in a way that significantly reduces material waste relative to the prior art, which in turn reduces cost. These and other features are discussed in greater detail in the following paragraphs of this detailed description.

Figure 1:
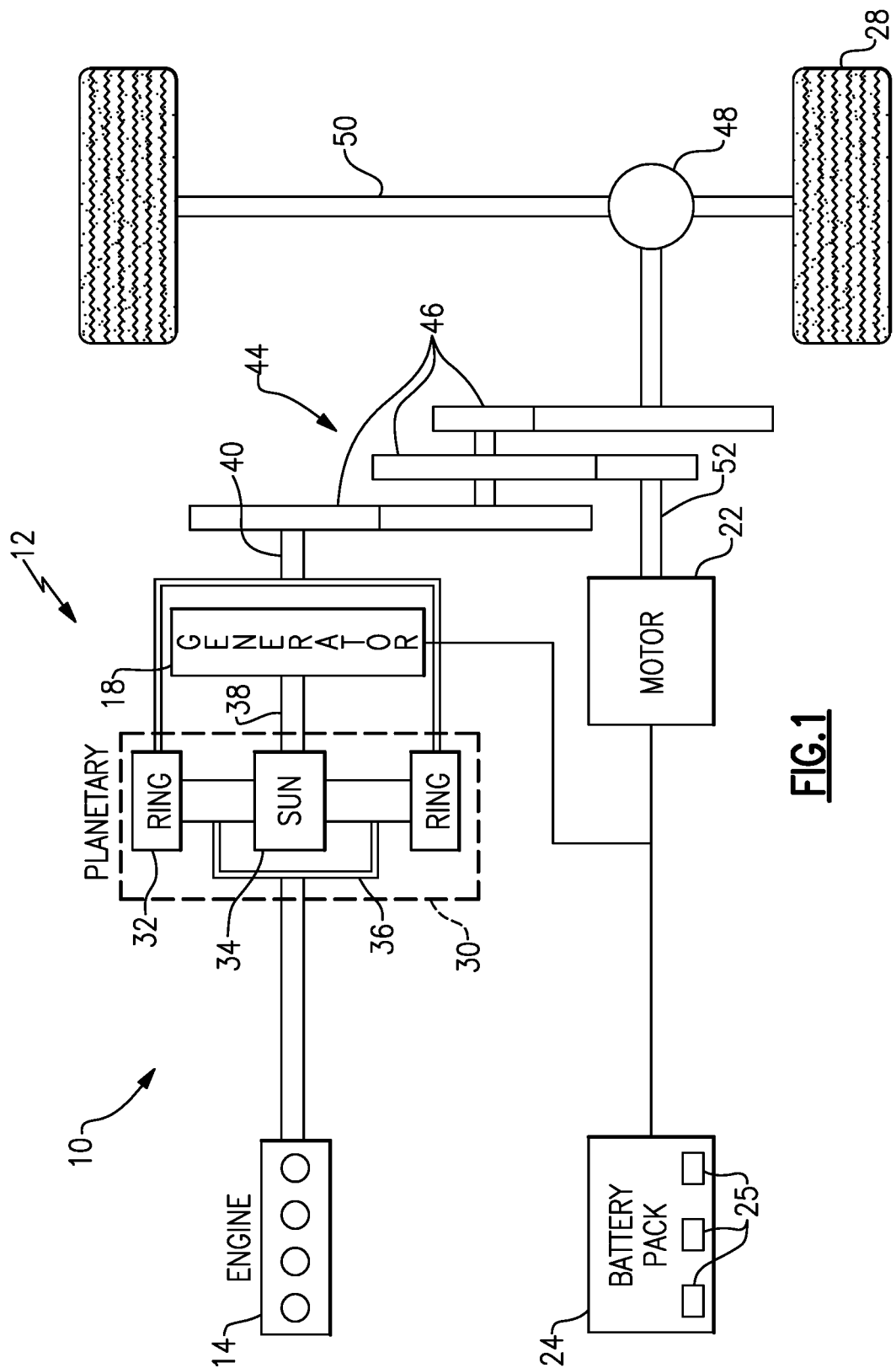
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's) and battery electric vehicles (BEV's).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary electrified vehicle battery. The battery assembly 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
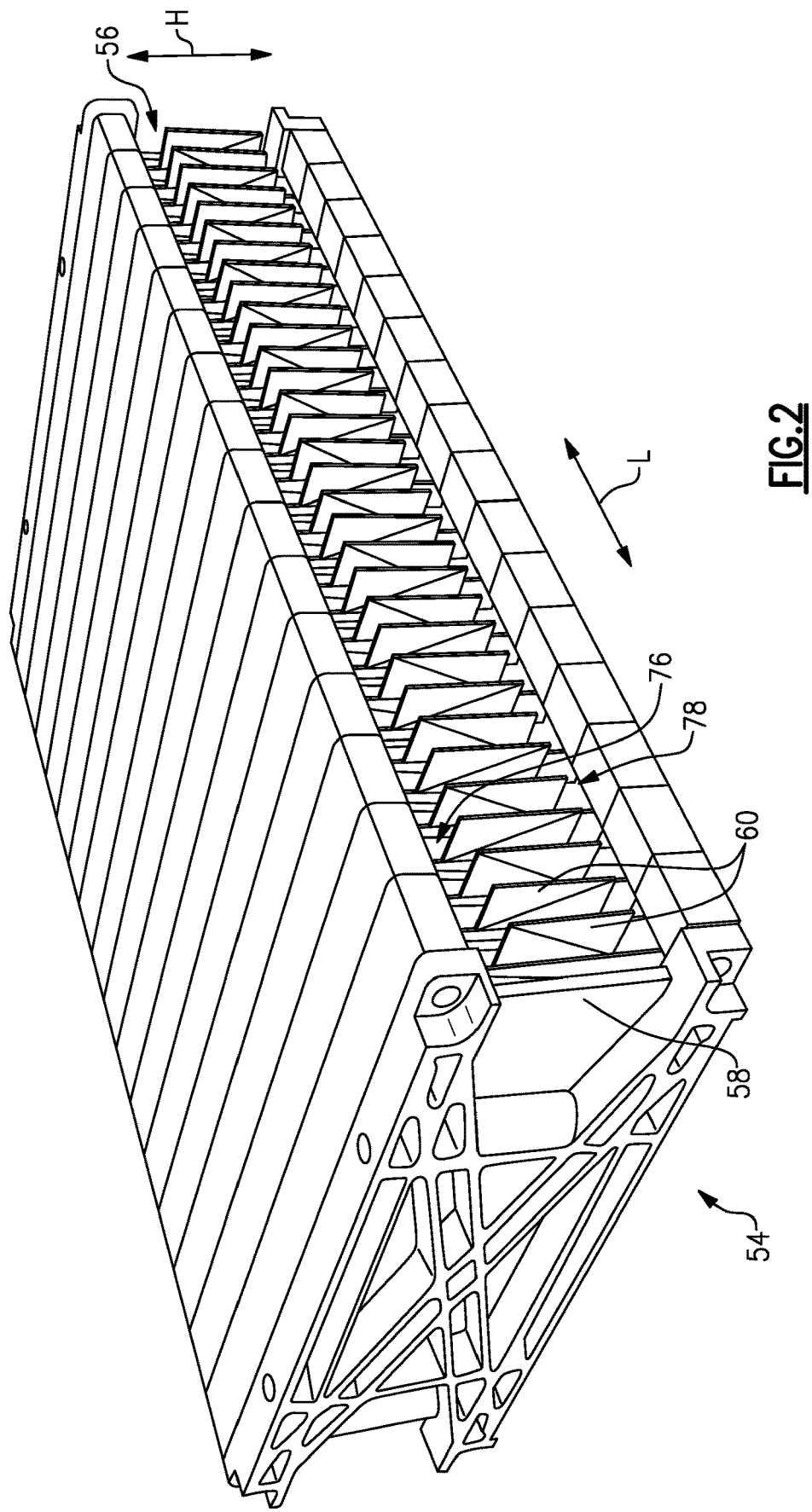
FIG. 2 schematically illustrates a battery assembly of an electrified vehicle.

FIG. 2 illustrates a battery assembly 54 that can be incorporated into an electrified vehicle. For example, the battery assembly 54 could be employed within the electrified vehicle 12 of FIG. 1. The battery assembly 54 includes one or more battery arrays, which can be described as groupings of battery cells, for supplying electrical power to various vehicle components. In this example the battery assembly 54 includes a single battery array 56. However, it should be understood that battery assembly 54 could include multiple battery arrays.

The battery array 56 includes a plurality of battery cells 58 that are stacked side-by-side along a length L of the battery array 56. In one embodiment, the battery cells 58 are prismatic, lithium-ion cells. However, battery cells having other geometries (cylindrical, pouch, etc.) and/or other chemistries (nickel-metal hydride, lead-acid, etc.) could alternatively be utilized within the scope of this disclosure.

The battery array 56 can be arranged to connect the battery cells 58 in a desired manner. In one example, certain of the battery cells 58 are connected in parallel, while certain others are connected in series. In other examples, all of the battery cells 58 are connected in parallel.

In this disclosure, the battery cells 58 are connected using busbar assemblies. Busbar assemblies carry current from one battery cell 58 to another. In particular, the battery cells 58 each include two electrical terminals—a positive terminal and a negative terminal—which are connectable using busbar assemblies. In this disclosure, the battery cells 58 each include at least one tab 60 projecting from a side of the battery array 56. In one particular example, the battery cells 58 each include two tabs 60 projecting from opposite sides of the battery array 56, with one tab electrically coupled to a negative terminal of the cell and the other tab electrically coupled to the positive terminal of the cell. In this regard, the tabs 60 may be part of the battery cells 58, and can be referred to as cell tabs. In other examples, each tab 60 may be connected to similarly-charged terminals (e.g., both negative, or both positive) of more than one cell.

Figure 3:
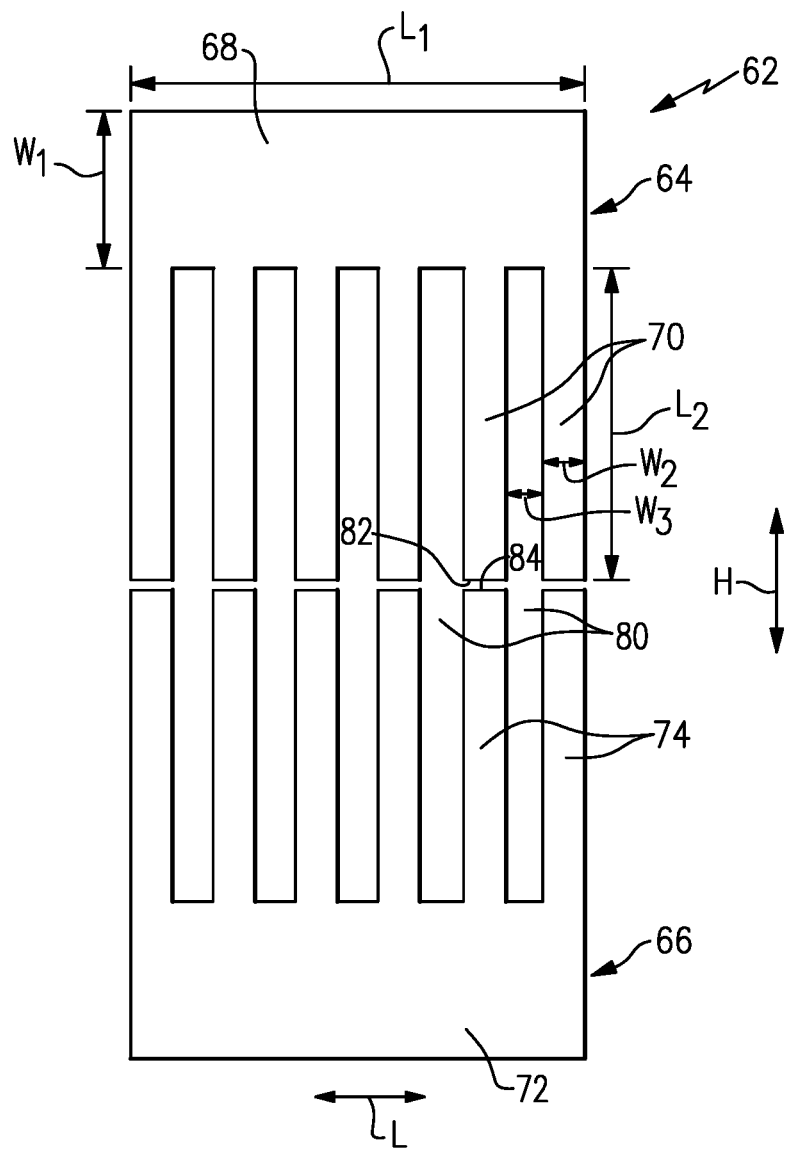
FIG. 3 illustrates an example busbar assembly including a first busbar component and a second busbar component.

FIG. 3 illustrates an example busbar assembly 62 according to this disclosure. For ease of reference, FIG. 3 illustrates the busbar assembly 62 as it would be mounted to the side of the battery array 56, in one example, without illustrating the detail of the battery array 56. The length L and height H directions of the battery array 56 are shown in FIG. 3 for reference. It should be understood that one or more busbar assemblies 62 may be mounted to each side of the battery array 56, depending on the particular application.

The busbar assembly 62 includes a first busbar component 64 and a second busbar component 66. In use, terminals of a plurality of battery cells 58 are electrically coupled to both the first and second busbar components 64, 66. The first and second busbar components 64, 66 are made of a conductive material, such as copper or other suitable conductive materials like bi-metals, and are capable of carrying current from the battery cells 58 and distributing the same throughout the battery array 56.

With continued reference to FIG. 3, the first busbar component 64 includes a carrier 68 and a plurality of feeders 70 projecting from the carrier 68. The second busbar component 66, in this example, is sized and shaped substantially the same as the first busbar component 64, and also includes a carrier 72 and a plurality of feeders 74 projecting from the carrier 72. In this example, the first and second busbar components 64, 66 are intended to be identically sized, however the term "sized and shaped substantially the same" is used in this particular respect to account for manufacturing inaccuracies. Further, in this example, there are six feeders 70, 74 projecting from the carriers 68, 72, but it should be understood that the amount of feeders can vary depending on the battery array configuration and number of battery cells 58.

In one example, the carriers 68, 72 extend along a side of the battery array 56 in a direction parallel to the length L of the battery array 56. The carriers 68, 72 have a length $L_1$ and a width $W_1$ (only labeled relative to carrier 68). When mounted to the battery array 56, the length $L_1$ is parallel to the length L.

The feeders 70, 74 project from a respective carrier 68, 72 by a length $L_2$, and each feeder 70, 74 has a width $W_2$ (only labeled relative to one of the feeders 70). The feeders 70, 74 are equally spaced-apart from one another, and in this example are each spaced-apart from one another by a width $W_3$. In this example, the width $W_3$ is substantially equal to the width $W_2$. When mounted to the battery array 56, the first and second busbar components 64, 66 are arranged such that the feeders 70, 74 face one another, and such that the feeders 70, 74 are substantially aligned relative to the length L of the battery array 56.

In one example, the carrier 68 of the first busbar component 64 is positioned above the tabs 60, relative to the height H of the battery array, in a first location 76 (FIG. 2), and the carrier 72 of the second busbar component 66 is positioned below the tabs 60 in a second location 78 (FIG. 2). In this way, the carriers 68, 72 of the first and second busbar components 64, 66 are parallel to one another. The aligned feeders 70, 74 define windows 80 between adjacent feeders 70, 74. The windows 80 have a width $W_3$ and a length substantially equal to twice $L_2$. In this example, the ends 82, 84 of the feeders 70, 74 are spaced-apart from one another by a relatively small gap such that current will not flow between the feeders 70, 74 until connected by a tab 60. As will be discussed below, the windows 80 allow for attachment of the tabs 60 to the busbar assembly 62.

Figure 4:
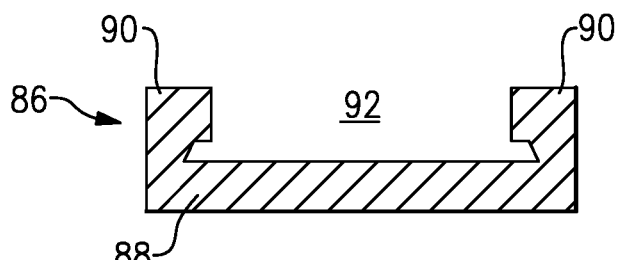
FIG. 4 is a cross-sectional view of an example frame for attaching the busbar assembly to a battery array.

In one example, the first and second busbar components 64, 66 are mounted to the side of the battery array 56 by a frame. FIG. 4 is a cross-sectional view of one example frame 86. In this example, the frame 86 includes a base 88 and cantilevered arms 90 projecting from opposite sides of the base 88. The frame 86 includes a recess 92 between the cantilevered arms 90. A width of the cantilevered arms 90 is thickest away from the base 88, such that the recess 92 is widest adjacent the base 88. In use, one of the first or second busbar components 64, 66 is pushed against the cantilevered arms 90, which urges the cantilevered arms 90 away from one another. The busbar component then rests against the base 88 at the widest part of the recess 92. When the busbar component is against the base 88, the cantilevered arms 90 are biased back toward one another and maintain the position of the busbar component. While FIG. 4 illustrates one example type of connective frame, it should be understood that other types of connections come within the scope of this disclosure.

Figure 5:
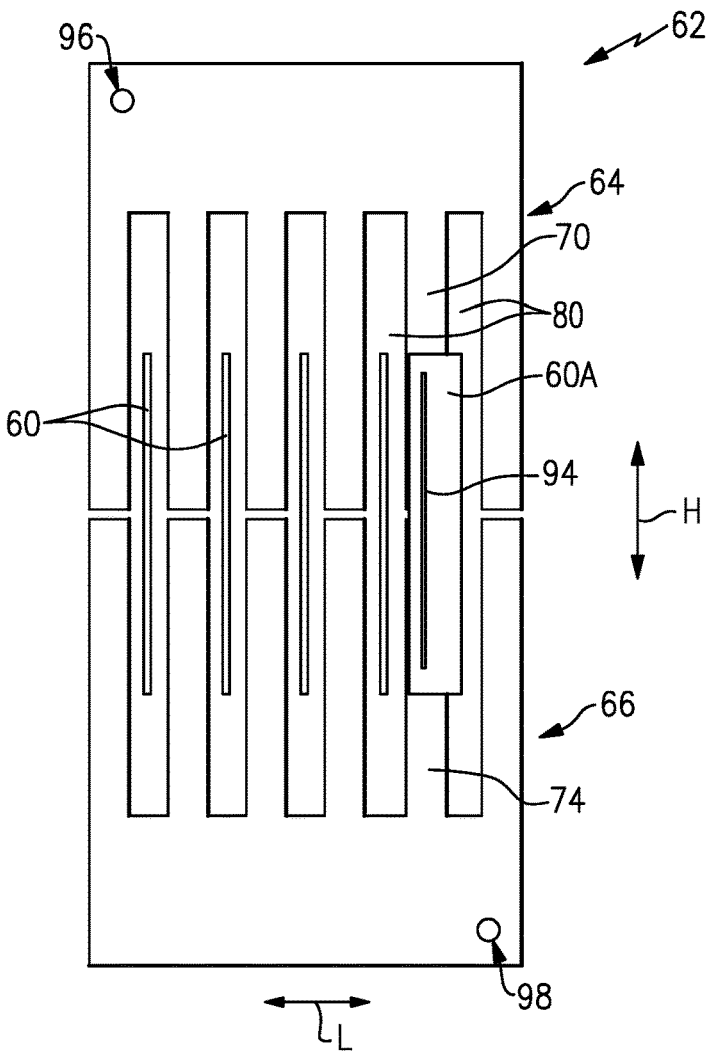
FIG. 5 illustrates the example busbar assembly arranged relative to a plurality of tabs.

FIG. 5 illustrates the manner in which the first and second busbar components 64, 66 may be mechanically and electrically coupled to the battery cells 58. In FIG. 5, the first and second busbar components 64, 66 are arranged in the same way as in FIG. 3. FIG. 5 shows, on a schematic level, the first and second busbar components 64, 66 as they would be arranged on the side of the battery array 56, and in particular shows the tabs 60 projecting through the windows 80.

In this example, each of the tabs 60 are moveable, and are in particular bendable, between a straight position and a folded position. In FIG. 5, there are four tabs 60 projecting through respective windows in a straight position, and one tab 60A that has been folded to a folded position. In the folded position, the tab 60A is in direct contact with both the first busbar component 64 and the second busbar component 66. In particular, the tab 60A is in direct contact with one of the feeders 70 and a corresponding one of the feeders 74. To affix the tab 60A to the busbar assembly 62, in one example the tab 60A is welded to the feeders 70, 74. A weld is represented at 94 in FIG. 5. While only one tab 60A is in the folded position in FIG. 5, each of the tabs 60 would be folded and affixed to respective ones of the feeders 70, 74 in a similar manner. While welding is mentioned herein, it should be understood that other attachment techniques come within the scope of this disclosure.

When all tabs are connected to corresponding feeders 70, 74, the current from the battery cells 58 is distributed throughout the battery array. In one example, the busbar assembly 62 includes an electrical input 96 and an electrical output 98. In this example, the electrical input 96 is on the first busbar component 64, and the electrical output 98 is on the second busbar component 66, although the opposite could be true. Further, in another arrangement, the electrical input and output 96, 98 could be provided on the same one of the first or second busbar component 64, 66. In any case, the electrical input and output 96, 98 are used to electrically couple the busbar assembly 62 to other busbar assemblies within the battery array 56, for example, depending on the particular application. Additionally, the electrical input 96 could be a main electrical input for the battery cell, meaning the input would be on the most positive or negative portion of the array. Likewise, the electrical output 98 could be a main electrical output for the battery cell. In other examples where there is more than one busbar assembly 62 on each side of the battery array, the electrical input and output 96, 98 are intermediate inputs and outputs.

In this disclosure, the busbar assembly 62 is a two-piece assembly and consists only of the first busbar component 64 and the second busbar component 66. By providing the busbar assembly 62 as a two-piece assembly, ease of manufacture is increased and material waste is significantly reduced relative to prior techniques. The reduction in material waste will be appreciated with reference to the method of forming the busbar assembly 62, which will now be described.

Another aspect of this disclosure relates to a method of making a busbar assembly having a first busbar component and a second busbar component from a blank of raw material. In one particular example, the first and second busbar components are formed using a single cutting step.

Figure 6:
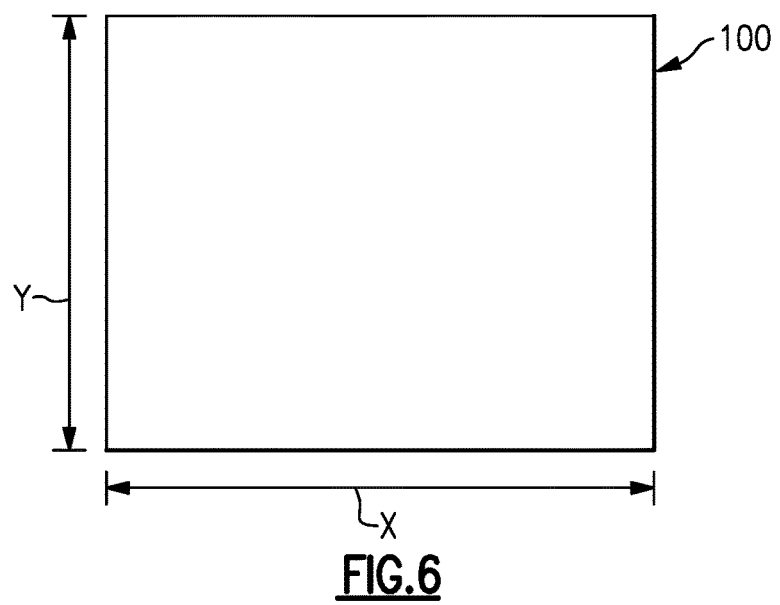
FIG. 6 illustrates a blank of material from which the busbar assembly is formed, in one example.

FIG. 6 illustrates an example blank 100 of material for forming the busbar assembly 62. In one example, the blank 100 is a single piece of conductive material, such as copper, although other conductive materials can be used. In this example, the blank 100 is rectangular. The blank 100 has a width X and a height Y. In one example, the width X is equal to $L_2$ plus twice $W_1$, and the height Y is equal to $L_1$ plus $W_2$.

Figure 7:
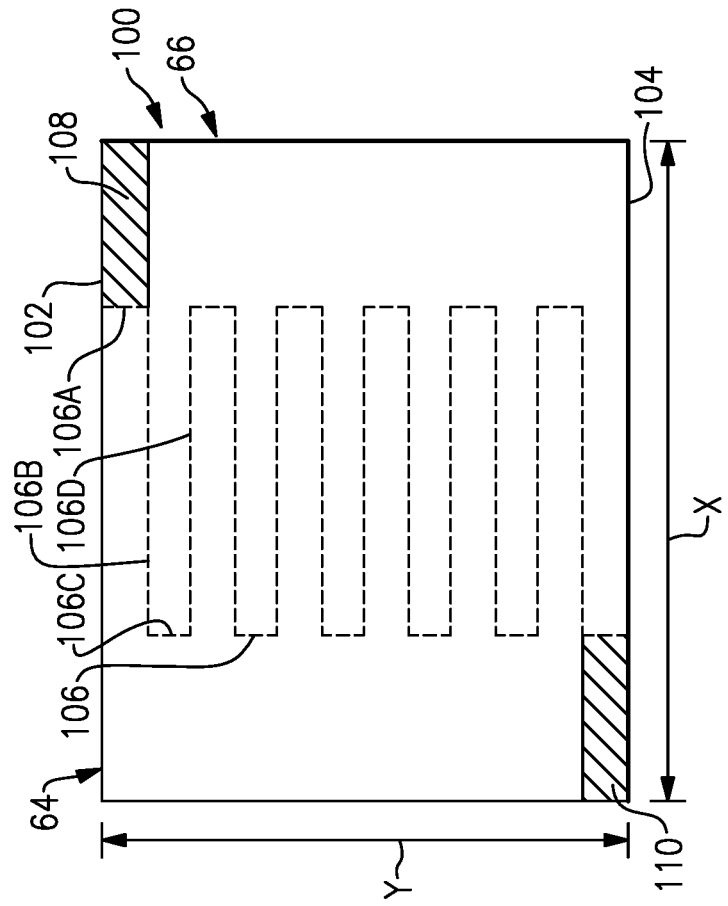
FIG. 7 illustrates the blank of raw material and an example cutting path.

With reference to FIG. 7, the first and second busbar components 64, 66 are formed by cutting the blank 100 beginning at a first perimeter edge 102 of the blank and ending at a second perimeter edge 104 of the blank opposite the first perimeter edge 102. In this example, a cutting path is illustrated at 106. The blank 100 is cut along the cutting path 106 using a laser-cutting process in one example, although it should be understood that other manufacturing processes come within the scope of this disclosure.

In this example, the cutting path 106 is generally a serpentine pattern between the first perimeter edge 102 and the second perimeter edge 104. The serpentine pattern corresponds to the shape of the first and second busbar components 64, 66 (labeled in FIG. 7 for reference). The serpentine pattern allows the first and second busbar components 64, 66 to be formed from a single blank 100 of material by a single cutting step.

The cutting path 106 in this example includes a plurality of perpendicular turns (e.g., ninety-degree turns). In one particular example, the cutting path 106 begins at the first perimeter edge 102 and initially extends into the blank 100 in a first direction perpendicular to the first perimeter edge 102 by a distance equal to $W_2$, as represented at line segment 106A. The cutting path 106 then takes a perpendicular turn and travels in a second direction by a distance equal to $L_2$, as represented at line segment 106B. The cutting path 106 then makes a perpendicular turn back to the first direction and travels a distance equal to $W_2$, as represented at line segment 106C. The cutting path then makes another perpendicular turn and travels in a third direction opposite the second direction by a distance equal to $L_2$, as represented at line segment 106D. The cutting path 106 continues in this manner until it reaches the second perimeter edge 104.

Figure 8:
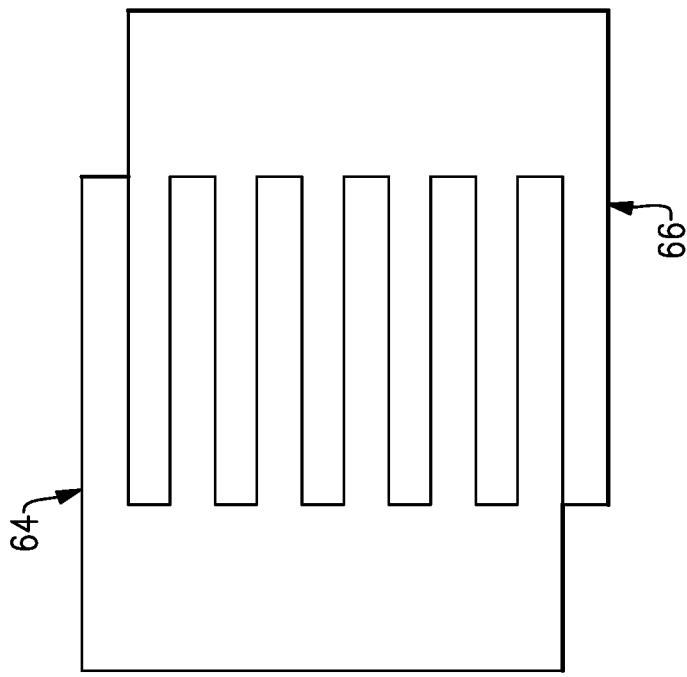
FIG. 8 illustrates the blank of raw material after a cutting process is complete.

By following the cutting path 106 shown in FIG. 7, material waste is significantly reduced, and in particular there is no wasted material between the feeders 70, 74. For instance, the only waste when following the cutting path 106 of FIG. 7 are two relatively small pieces 108, 110. The pieces 108, 110 have a length equal to $W_1$ and a width equal to $W_2$. After removing the pieces 108, 110, the result of the cutting process is shown in FIG. 8.

Figure 9:
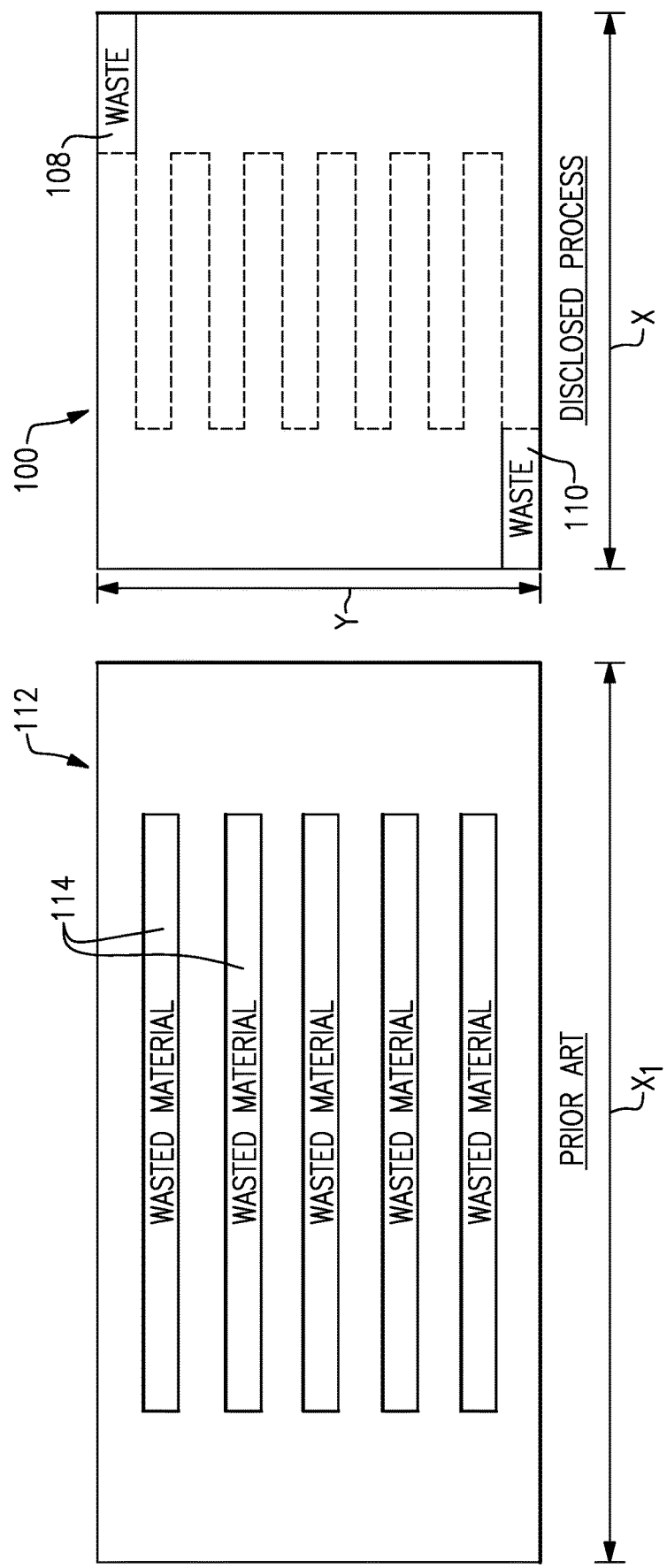
FIG. 9 is a side-by-side comparison of a busbar formed using a known process relative to the disclosed process.

FIG. 9 is a to-scale comparison of a known one-piece busbar, which is formed using an existing technique, relative to the busbar assembly formed using the disclosed process. An example known busbar is shown at 112. The busbar 112 has a width $X_1$ and a height Y. The height Y is about the same as the height of the blank 100 of the present disclosure, but the width $X_1$ is about twice as large as the width X of the blank 100. Thus, the busbar 112 is formed using a substantially larger piece of material than the disclosed busbar assembly 62.

Further, the busbar 112 is formed from a single piece of material by removing windows 114 from the center of the material. The windows 114 are thus labeled as "wasted material" in FIG. 9. On the other hand, the pieces 108, 110 (labeled "waste" for reference in FIG. 9) are the only wasted material in the disclosed process, and the pieces 108, 110 are relatively small compared to the windows 114. Note that the windows 114 are sized substantially the same as the windows 80, whereas the pieces 108, 110 are much smaller.

Accordingly, by providing a multi-piece busbar assembly (e.g., a two-piece busbar assembly) as opposed to a one-piece busbar, not only is the present busbar assembly 62 formed from a much smaller blank of material to begin with, but less of that blank is wasted during manufacturing. Thus, the present disclosure provides significant cost savings relative to the prior art.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:
1. A method of making a battery assembly, comprising:
   forming a first busbar component and a second busbar component from a blank of material;
   attaching the first busbar component and the second busbar component to an array of battery cells, wherein each cell in the array includes a terminal, and wherein each terminal is connected to both the first busbar component and the second busbar component.

2. The method of making the battery assembly as recited in claim 1, wherein each terminal is electrically coupled to a tab, and wherein the attaching step includes connecting each tab to both the first busbar component and the second busbar component.

3. The method of making the battery assembly as recited in claim 2, wherein the attaching step includes welding each tab to both the first busbar component and the second busbar component.

4. The method of making the battery assembly as recited in claim 2, wherein:
   each of the first busbar component and the second busbar component includes a carrier and a plurality of feeders projecting from the carrier, and
   the attaching step includes connecting each tab directly to a respective feeder of the first busbar component and a corresponding feeder of the second busbar component.

5. The method of making the battery assembly as recited in claim 4, wherein each of the tabs contacting the first busbar component and the second busbar component are connected to a similarly-charged terminal.

\* \* \* \* \*